(12) United States Patent
Carlson

(10) Patent No.: US 6,493,175 B1
(45) Date of Patent: *__Dec. 10, 2002__

(54) RUN-OUT CORRECTION ADJUSTMENT METHOD AND SYSTEM

(75) Inventor: Lance R. Carlson, Niwot, CO (US)

(73) Assignee: STMicroelectronics N.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,738

(22) Filed: Dec. 23, 1998

(51) Int. Cl.[7] .............................. G11B 5/55; G11B 5/596
(52) U.S. Cl. .................................. 360/78.04; 360/77.04
(58) Field of Search ............................. 360/78.04, 75, 360/77.04, 78.09

(56) References Cited

U.S. PATENT DOCUMENTS 5,886,846 A * 3/1999 Pham et al. ............. 360/78.04
5,995,316 A * 11/1999 Stich ....................... 360/77.04
6,088,186 A * 7/2000 Carlson .................... 360/77.04

* cited by examiner

Primary Examiner—David Hudspeth
Assistant Examiner—Mitchell Slavitt
(74) Attorney, Agent, or Firm—Lisa K. Jorgenson; Steven H. Slater

(57) ABSTRACT

A disk drive system corrects run-out errors without substantial PES transients and without significant response time. The disk drive system includes a servo compensation system coupled to a read/write head. The servo compensation system is adapted to generate a run-out correction waveform for a track in a disk. The run-out correction waveform includes one or more sinusoidal component waveforms, each of which is defined by a phase and an amplitude. The method includes measuring an amplitude and a phase of one or more sinusoidal component waveforms for a set of specified tracks in a disk. The method also includes determining a phase and an amplitude of one or more sinusoidal component waveforms for a destination track based on a measured amplitude and a measured phase of the one or more measured sinusoidal component waveforms. The sinusoidal component waveforms for the destination track are adapted to substantially correct a run-out error in the destination track. The method further includes generating a run-out correction waveform for the destination track such that the disk drive system substantially corrects the run-out error in the destination track.

44 Claims, 5 Drawing Sheets

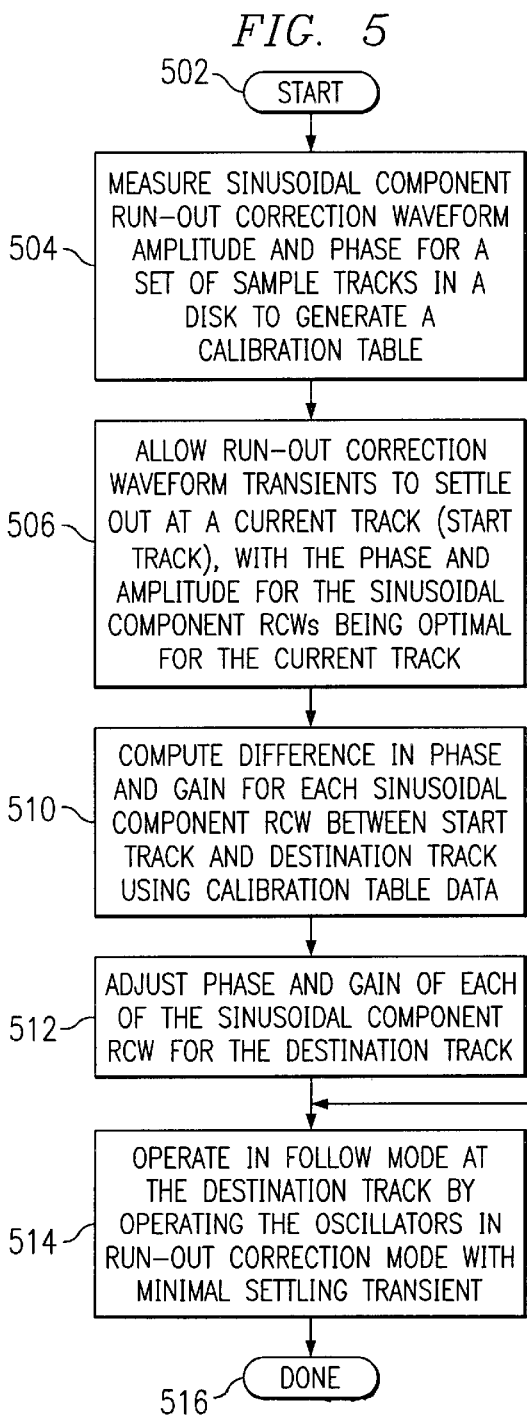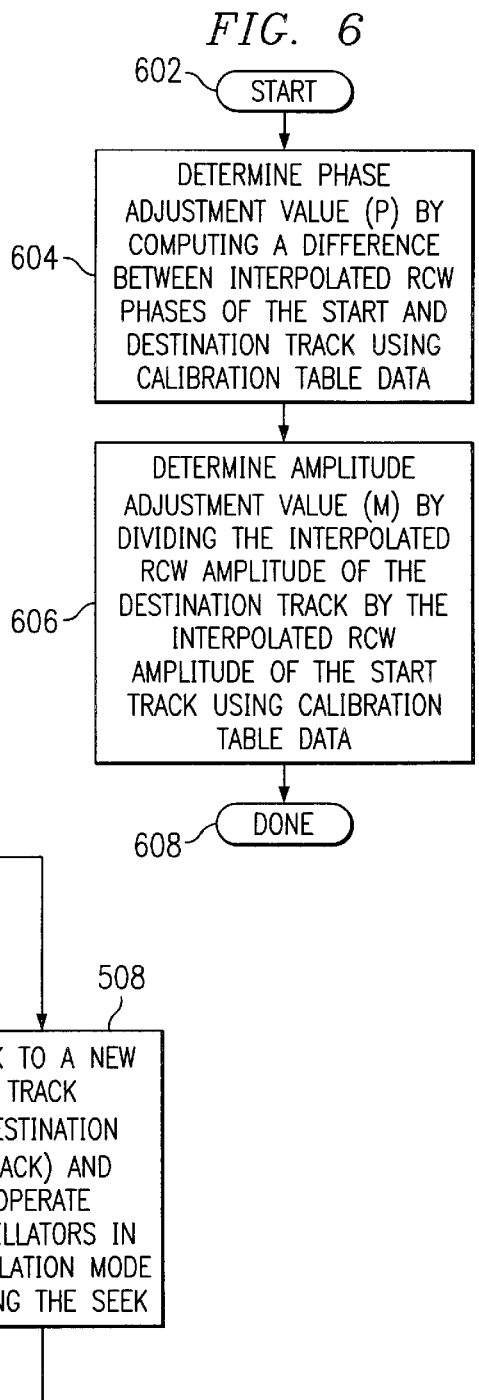

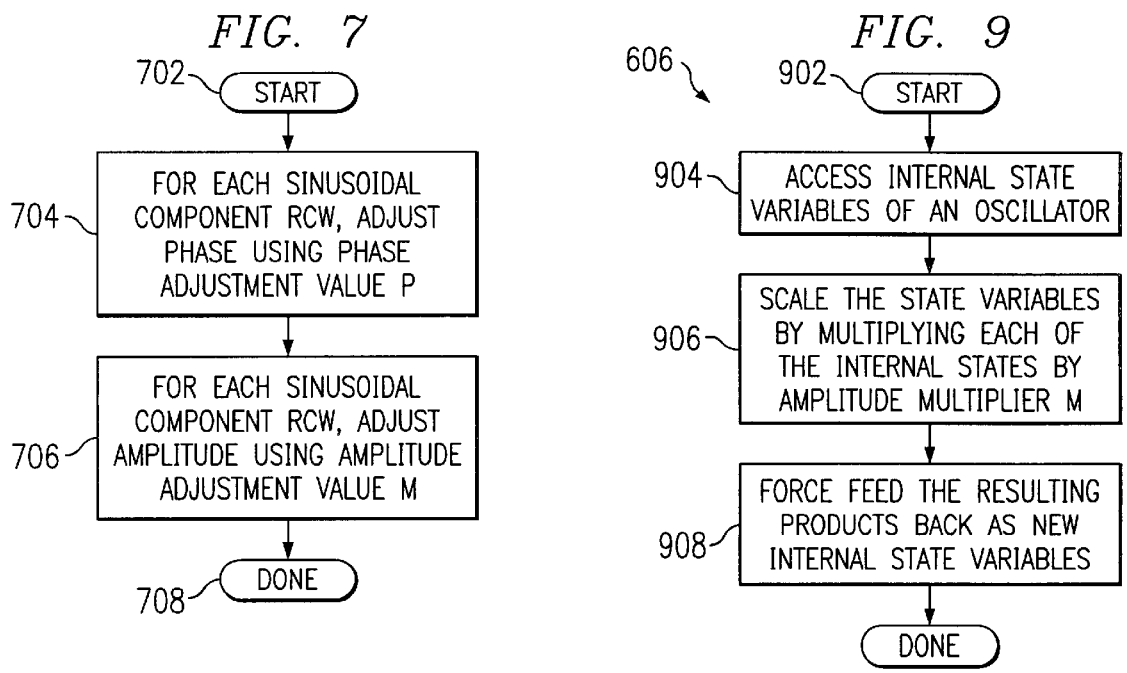

RUN-OUT CORRECTION ADJUSTMENT METHOD AND SYSTEM

CROSS REFERENCE TO RELATED APPLICATIONS

The present application is related to commonly assigned U.S. Pat. No. 6,088,186, entitled "Servo Compensation System," which is incorporated herein by reference.

BACKGROUND OF THE INVENTION

1. Field of the Invention

This invention relates generally to the field of servo compensation for disk storage systems, and more particularly to a feedback control system that corrects run-out error and operates as an oscillator.

2. Description of the Related Art

Modern computer systems typically include one or more disk drive systems for storing data. The disk drive systems generally store the data in circular tracks on a disk such as magnetic or optical disks. To read and/or write data from a disk, the disk drive systems employ a read/write head to write or read data to and from a specified track in the disk.

A read/write operation typically requires the disk drive system to operate in a seek mode followed by a follow mode. In the seek mode, the disk drive system locates a desired destination track and moves the head to the destination track. In the follow mode, the disk drive system adjusts the position of the head to precisely follow the destination track so that the data can be written to or read from the destination track.

During the follow mode, however, conventional disk drive systems typically encounter run-out errors. Run-out errors may occur due to various physical imperfections in the disk or the disk drive system that causes the head to be imperfectly positioned over the destination track. For example, a run-out error may occur when the disk or the circular tracks on the disk do not spin perfectly about the central axis of the disk. This condition causes a first harmonic run-out error, which is typically the same on all tracks of the disk. In addition, a second harmonic run-out condition can occur due, for example, to a warping of the disk, in which case the run-out error may be substantially different at different tracks.

FIG. 1 illustrates a schematic diagram of an exemplary disk drive system 100 for showing a run-out error. The disk drive system 100 includes a disk 102 having a circular track 104 centered about a disk center 110. A head 108 is attached to an actuator 106 for writing or reading data to and from the track 104 on the disk 102. The disk center 110 is not concentric with the spin axis 112 of the disk 102. In this arrangement, the misalignment of the disk center 110 and the spin axis 112 causes the head 108 to be positioned off the center of the track 104 as the disk 102 spins, thereby resulting in a run-out error.

In order to properly perform read and write operations on a track, the head must be following the desired track without substantial run-out errors. For instance, if the head is mis-positioned over a particular track during a write operation, data may be partially written on an adjacent track, thereby overwriting the previously written data on the adjacent track and causing catastrophic loss of the data. During a read operation on the other hand, mis-positioning of the head due to a run-out error may cause a degrade of the read back signal such that the desired data may not be read properly. Hence, the run-out error must be substantially corrected before writing or reading data to and from the desired track.

To correct run-out errors, convention disk drive systems generally employ a servo compensation system in a feedback arrangement. For example, U.S. Pat. No. 6,088,186, entitled "Servo Compensation System" describes in the background, several conventional disk drive systems utilizing a servo compensation system for correcting run-out errors.

Unfortunately, however, these traditional disk drive systems and methods typically require a substantial response time to adjust the head properly over the destination track in the follow mode if the run-out conditions are not the same on all tracks. For example, a conventional disk drive system gradually adjusts the position of a head to the center of a destination track over several revolutions of the disk in a feedback loop arrangement. These extra revolutions of the disk lengthens access time of the disk drive by several folds. Since disk drive access times typically represent one of the critical paths in a computer system, such a lengthy response time to adjust to the destination track is undesirable.

Thus, what is needed is a method and a system for efficiently correcting run-out errors in disk drive systems without a substantial response time to adjust to the physical conditions of the destination track.

SUMMARY OF THE INVENTION

The present invention fills these needs by providing a method and a system that efficiently compensate for run-out errors without substantial transients and with significant improvement in response time. It should be appreciated that the present invention can be implemented in numerous ways, including as a process, an apparatus, a system, a device, a method, or a computer readable medium.

The present invention provides a method for correcting run-out errors in a disk drive system, which includes a servo compensation system coupled to a read/write head. The servo compensation system is adapted to generate a run-out correction waveform for a track in a disk. The run-out correction waveform including one or more sinusoidal component waveforms, each of which is defined by a phase and an amplitude. The method includes measuring an amplitude and a phase of one or more sinusoidal component waveforms for a set of specified tracks in a disk. The method also includes determining a phase and an amplitude of one or more sinusoidal component waveforms for a destination track based a measured amplitude and a measured phase of the one or more measured sinusoidal component waveforms. The sinusoidal component waveforms for the destination track are adapted to substantially correct a run-out error in the destination track. The method further includes generating a run-out correction waveform for the destination track such that the disk drive system substantially corrects the run-out error in the destination track.

In another embodiment, the present invention provides a servo compensation system for correcting run-out errors in a disk drive system, which includes the servo compensation system coupled to a read/write head. The servo compensation system is adapted to generate a run-out correction waveform for a track in a disk. Each run-out correction waveform includes one or more sinusoidal component waveforms and each sinusoidal component waveform is defined by a phase and an amplitude. The system includes means for measuring an amplitude and a phase of one or more sinusoidal component waveforms for a set of specified tracks in a disk. The system also includes means for determining a phase and an amplitude of one or more sinusoidal component waveforms for a destination track based on a measured amplitude and a measured phase. The one or more sinusoidal component waveforms for the destination track are adapted to substantially correct a run-out error in the destination track. In addition, the system includes means for generating the one or more sinusoidal component waveforms for the destination track such that the disk drive system substantially corrects the run-out error in the destination track.

In yet another embodiment, a method for adjusting run-out correction waveforms in a disk drive system is disclosed. The disk drive system includes a servo compensation system coupled to a read/write head. The servo compensation system is adapted to generate sinusoidal component run-out correction waveforms, each of which is defined by a phase and an amplitude. The disk drive system operates in a seek mode from a start track to a destination track. The start track and the destination track have sinusoidal component run-out correction waveforms that are each defined by a phase and an amplitude. The method includes (a) adjusting, for each sinusoidal component run-out correction waveforms, the phase from a sinusoidal component run-out correction waveform for the start track in response to the phase adjustment value; (b) adjusting, for each sinusoidal component run-out correction waveforms, the amplitude from the start track in response to the amplitude adjustment value; and (c) generating the sinusoidal component run-out correction waveforms for the destination track such that the disk drive system substantially corrects the run-out error in the destination track.

The present invention thus provides methods and a system for efficiently correcting run-out errors in disk drive systems without a substantial response time to adjust to the physical conditions of the destination track. In addition, the present invention reduces position error signal transients after seeks by forcing the compensation system to generate a proper run-out correction waveform immediately after a seek operation. Accordingly, run-out errors are corrected substantially instantaneously at the beginning of a follow mode without a substantial response time. These and other advantages of the present invention will become apparent to those skilled in the art upon a study of the specification and drawings describing the present invention.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 5 illustrates a flow chart of a method for correcting run-out errors in a disk drive system in accordance with one embodiment of the present invention.

FIG. 6 illustrates a more detailed flow chart of computing the difference in phase and amplitude for each sinusoidal component RCW between the start and destination tracks in accordance with one embodiment of the present invention.

FIG. 7 illustrates a more detailed flow chart of adjusting the phase and gain of each of the sinusoidal component RCW for the destination track in accordance with one embodiment of the present invention.

FIG. 8 shows a more detailed flow chart of an operation of adjusting the phase of a run-out correction waveform for the start track to generate a phase of the run-out correction waveform for the destination track.

FIG. 9 illustrates a more detailed flow chart of an operation of adjusting the amplitude of a run-out correction waveform for the start track to generate an amplitude of the run-out correction waveform for the destination track.

DETAILED DESCRIPTION OF THE PREFERRED EMBODIMENTS

The present invention will now be described in detail with reference to exemplary preferred embodiments as illustrated in the accompanying drawings. In the following description, numerous specific details are set forth in order to provide a thorough understanding of the present invention. It will be apparent, however, to one skilled in the art, that the present invention can be practiced without some or all of these specific details. In other instances, well known process steps have not been described in detail in order not to unnecessarily obscure the present invention.

The present invention provides a method and a system for correcting run-out errors in a disk drive system substantially instantaneously by generating run-out correction waveforms (RCWs). A run-out correction wave form includes one or more sinusoidal component waveforms. The method and system first measures amplitude and phase for the sinusoidal component run-out correction waveforms for a set of tracks in the disk drive system before normal seek operations are performed. The measured amplitudes and phases for the set of tracks are then stored and used, during subsequent seek operations, to determine the amplitude and phase for the sinusoidal component RCWs for the destination track. During the seek operation or in a follow operation immediately after the seek operation, the present invention adjusts the phase and amplitude for the sinusoidal component waveforms such that the run-out error for the destination track is corrected substantially instantaneously to minimize access time.

Figure 1:
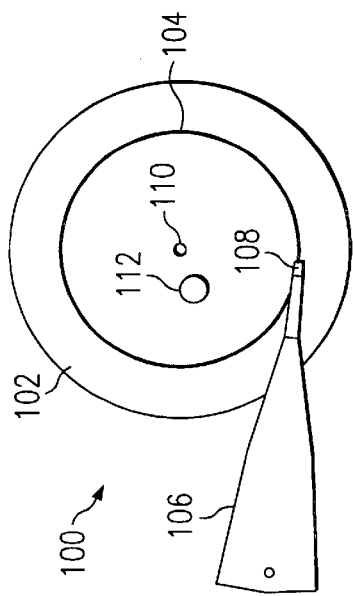
FIG. 1 illustrates a schematic diagram of an exemplary disk drive for showing a run-out error.
Figure 2:
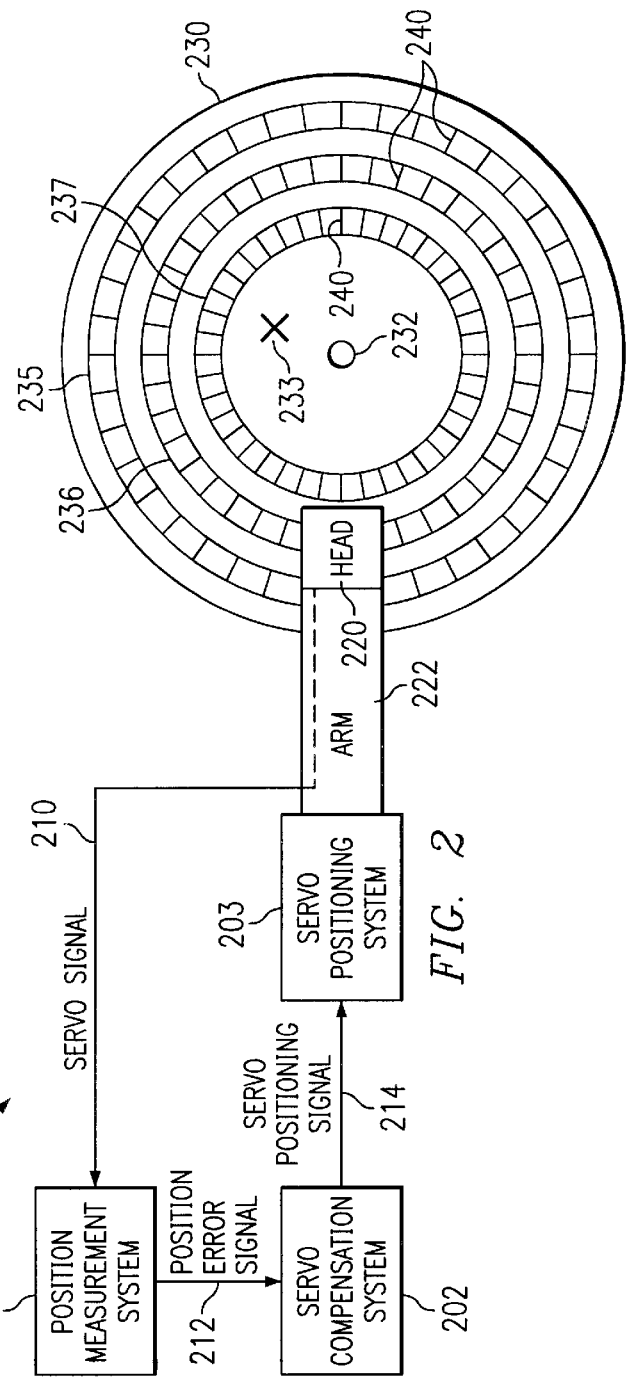
FIG. 2 illustrates a block diagram for a servo control system of an exemplary disk drive system in accordance with one embodiment of the present invention.

FIG. 2 illustrates a block diagram of an exemplary servo control system 200 in accordance with one embodiment of the present invention. The servo control system 200 includes a position measurement system 201, a servo compensation system 202, a servo positioning system 203, an arm 222, a head 220, and a disk 230. The servo positioning system 203 is operationally connected to the arm 222, which is attached to the head 220. The servo positioning system 203 moves the arm 222 to position the head 220 over a track on the disk 230 to read or write data. The disk 230 includes a plurality of exemplary concentric tracks 235, 236, and 237 that are used to store data. Each track contains a plurality of servo fields 240, which contain position data. The position data can be used to measure the position of the head 220 relative to a track.

It should be noted that the tracks 235, 236, and 238 are depicted herein for illustrative purposes. As such, those skilled in the art will appreciate that the disk 230 typically includes many more tracks laid out concentrically in the disk 230. In addition, the width of the tracks and the distance between the tracks are typically very small. For example, on some disks, the width of a track may typically be four microns and the distance between adjacent tracks may be about one micron. As the size of a disk continues to decrease while packing more data in a given track, it is envisioned that the track width and distance between adjacent tracks will continue to decrease in the future.

In a preferred embodiment of the present invention, the servo control system 200 are implemented disk drive systems such as fixed disks (e.g., hard disk), removable disks, floppy disks, etc. Although the present invention is illustrated in the context of magnetic disk systems, it should be appreciated that it can apply equally to any suitable disk storage systems including optical disk systems, or other similar disk systems. In these systems, the head 220 represents any suitable device that reads and/or writes data to or from a disk such as a magnetic read/write head, an optical transducer, a laser, or any similar device.

The position measurement system 201 receives a servo signal 210 from the head 220 and provides a position error signal 212 to the compensation system 202. The servo signal 210 is a read signal that contains encoded position information. The position measurement system 201 amplifies and demodulates the read signal to generate the position error signal 212.

The servo control system 200 operates in a seek mode and a follow mode for performing read and write operations. In the seek mode, the servo control system 200 re-positions the head 220 from one track ("start track") over a new track ("destination track"). That is, the servo control system 200 causes the head 220 to leave a start track such as track 235 and move over to a destination track such as track 236. The compensation system 202 provides the necessary servo positioning signal 214 to the servo positioning system 203 to enable the head 220 to move to the destination track. As will be discussed in more detail below, the servo positioning signal 214 contains a run-out correction signal, which includes the sinusoidal component RCWs 1F RCW and 2F RCW.

After the head 220 is positioned over the destination track 236, the servo control system 200 operates in the follow mode. In this mode, the servo control system 200 functions to position the head 220 to follow the destination track 236. Concurrently, the servo compensation system 202 provides a servo positioning signal 214 to the servo positioning system 203. The servo positioning signal 214 includes a servo compensation signal and a run-out correction signal containing the sinusoidal component RCWs, 1F RCW and 2F RCW.

The position measurement system 201 receives the servo signal 210 from the head 220 and determines the actual position of the head 220 relative to the track 236. The servo signal 210 is derived from position data in the servo fields 240, which are read from the disk 230 in the track 236. The actual position of the head 220 is then compared to the desired position of the head 220. The resulting difference represents the position error and is represented by the position error signal 212. Components of the position error signal includes various electrical and mechanical noise sources in addition to run-out errors.

The servo compensation system 202 includes a digital filter and processes the position error signal (PES) 212 during the follow mode to generate the servo positioning signal 214. The servo positioning signal 214 is provided to the servo positioning system 203, which converts the signal 214 into a force applied to the arm 222, thereby moving the head 220. The arm 222 may be an actuator, which employs a voice coil motor to move the actuator and the attached head. The servo positioning system 203 may include digital-to-analog converters (DACs) and/or amplifiers to convert the servo positioning signal 214 into an appropriate analog signal for the voice coil motor. The movement of the head compensates for the run-out error and other servo position errors by re-positioning the head 220 to be substantially centered over the destination track 236.

Figure 3A:
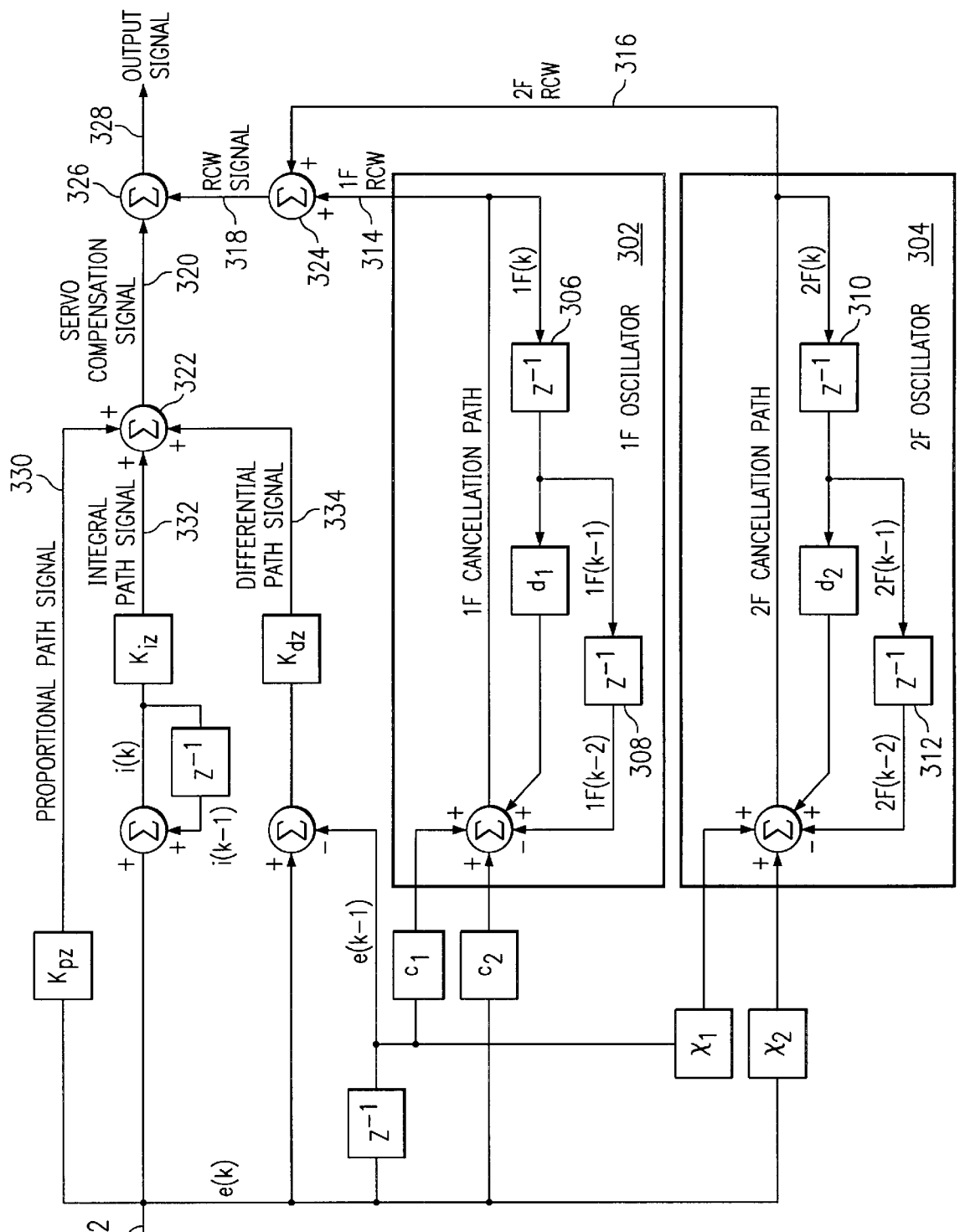
FIG. 3A shows a more detailed block diagram of a servo compensation system used during a follow mode in accordance with one embodiment of the present invention.

FIG. 3A shows a more detailed block diagram of the servo compensation system 202 in accordance with one embodiment of the present invention. The compensation system 202 employs digital filters where $z^{-1}$ is a delay of one sample. The basic operation of and theory behind the disk drive system 200 including the servo compensation system 202 are described in detail in commonly assigned U.S. Pat. No. 6,088,186, which was previously incorporated by reference.

The servo compensation system 202 includes a 1F oscillator 302 and a 2F oscillator 304 coupled in parallel with other components of the compensation system 202. The 1F oscillator 302 functions to generate a sinusoidal component RCW 1F(k) 314 (i.e., 1F RCS) for first harmonic of the spin frequency run-out errors. The 1F oscillator 302 receives a pair of inputs through gain block elements $C_1$ and $C_2$, which causes the oscillator amplitude and phase to adapt based on the position error signal (PES) as described in commonly assigned U.S. Pat. No. 6,088,186. A pair of delay elements 306 and 308 are used for storing previous two states of the 1F oscillator 302, 1F(k−1) and 1 F(k−2). A gain block element $d_1$ determines the oscillation frequency of the 1F oscillator, where $d_1$ is related to spin frequency f of the disk 230 and sample rate and is equal to 2*cosine (ωT), where ω is equal to 2πf, T is a digital sample period in seconds. During a seek mode, the oscillator 302 oscillates at a fixed phase and amplitude by decoupling the inputs from the gain block elements $C_1$ and $C_2$, such that the fixed phase and amplitude are equal to the phase and amplitude at the time the inputs are decoupled from the gain blocks.

Similarly, the 2F oscillator 304 operates to generate a run-out correction waveform 2F(k) 316 (i.e., 2F RCW) for second harmonic run-out errors. The 2F oscillator 304 receives a pair of inputs through gain block elements, $X_1$ and $X_2$, which causes the oscillator phase and amplitude to adapt based on the PES signal as described in commonly assigned U.S. Pat. No. 6,088,186. A pair of delay elements 310 and 312 are used to store previous two states of the 2F oscillator 404, 2F(k−1) and 2F(k−2). A gain block element $d_2$ determines the frequency of oscillation of the 2F oscillator 304, where $d_2$ is related to a spin frequency f of the disk 230 and sample rate and is equal to 2*cosine(2 ωT), where ω is equal to 2πf, T is a digital sample period in seconds. The multiplication of ωT by 2 allows the 2F oscillator 304 to oscillate at twice the first harmonic frequency. During a seek mode, the oscillator 304 oscillates at a fixed phase and amplitude by decoupling inputs from the gain block elements, X1 and X2, such that the fixed phase and amplitude are equal to the phase and amplitude of the oscillator 304 at the time the inputs are decoupled.

In a follow or run-out correction mode, the servo compensation system 202 employs a series of summers 322, 324, and 326 to generate an output signal 328 that corresponds to the servo positioning signal 214. The summer 324 is coupled to receive the 1F RCW 314 and 2F RCW 316 from the 1F and 2F oscillators 302 and 304, respectively. The summer 324 then adds the received 1F RCW 314 and 2F RCW 316 to generate a run-out correction signal 318. On the other hand, the summer 322 receives and adds a proportional path signal 330, an integral path signal 332, and a differential path signal 334 to generate a servo compensation signal 320. Then, the summer 326 adds the servo compensation signal 320 and the run-out correction signal 318 to generate the output signal 328, which corresponds to the servo positioning signal 214 in the follow mode.

Figure 3B:
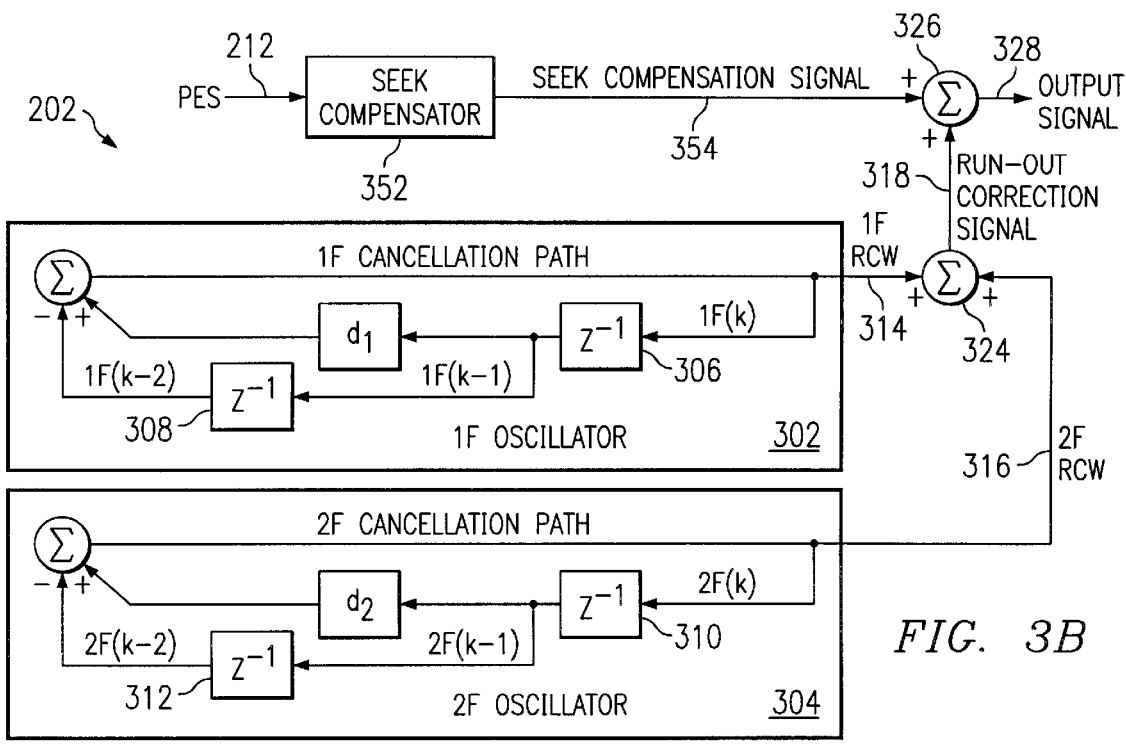
FIG. 3B illustrates a more detailed block diagram of the servo compensation system used during a seek mode in accordance with one embodiment of the present invention.

The oscillators 302 and 304 are configured to operate in either an oscillation or run-out correction mode. The oscillation mode is used during seek operations. FIG. 3B illustrates a block diagram of the servo compensation system 202 implemented during a seek mode in accordance with one embodiment of the present invention. In the oscillation mode, the input signal paths are disabled; however, the feedback paths in each oscillator continue to be operated, thereby providing oscillation.

In the oscillation mode, the 1F and 2F oscillators 302 and 304 are decoupled from the gain block elements so that no external input is provided to the oscillators 302 and 304. The 1F and 2F oscillators 302 and 304 generate 1F RCW 314 and 2F RCW 316 as outputs, which are provided to the summer 324 as inputs. The summer 324 sums the 1F RCW 314 and 2F RCW 316 to produce a run-out correction signal 318. A seek compensator 352 receives a position error signal 212 and generates a seek compensation signal 354. The seek compensation signal 354 and the run-out correction signal 318 are then provided to the summer 326, which sums the input signals 354 and 318 to generate an output signal 328, which corresponds to the servo positioning signal 214 in seek mode.

After a seek operation has been completed, the input signals to the oscillators 302 and 304 are enabled for normal run-out correction mode, where the phase and amplitude of the oscillators 302 and 304 are adapted to compensate for any variation in the run-out error conditions at the destination track. During this process, digital computational errors such as truncation may become significant relative to the state values of the oscillators 302 and 304. In such instances, those skilled in the art will appreciate that commonly used techniques may be used to scale the amplitude of the internal state values to reduce the errors for proper operation.

It should be appreciated that the compensation system 202 may be implemented using any suitable number of oscillators. For example, the compensation system 202 may utilize N oscillators to generate first through Nth harmonics of the run-out correction waveforms. In this case, an Nth oscillator may implement $d_n$ equal to $2*\cos(n\omega T)$, where n represents an nth harmonic.

During a track following operation, the oscillators 302 and 304 generate sinusoidal component waveform signals, 1F RCW 314 and 2F RCW 316, respectively, which are employed to correct the first and second harmonic run-out errors. These 1F RCW and 2F RCW waveforms 314 and 316 are referred to as sinusoidal component RCWs. By virtue of the input signal paths, the oscillators 302 and 304 are adapted to generate sinusoidal component RCWs 314 and 316, respectively, each of which is characterized by an amplitude and a phase. The amplitude and phase of the sinusoidal component RCWs 314 and 316 are used to correct the run-out at a current operating track. Accordingly, the sinusoidal RCWs represent current waveforms required to move the actuator such that the head remains positioned correctly over the desired track in the presence of run-out error conditions at the corresponding harmonics of the spin frequency.

After a seek, if the run-out errors at the new track are different from the run-out errors at the previous track, then the amplitude and phase of the sinusoidal component RCWs needed to correct run-out errors at the destination track will generally be different from the start track before the seek. In normal operation, the amplitude and phase of the sinusoidal component RCWs change gradually after the seek to the new RCWs required to correct run-out errors at the destination track. During the change in the sinusoidal component RCWs, the servo control system 200 may experience a transient condition where the position error signal becomes significantly greater than desired due to incorrect RCWs at this time.

The run-out correction oscillators 302 and 304 operate by feeding back the sinusoidal component RCWs delayed by one and two sample times and summing the delayed values back through gain blocks to form the next sinusoidal component RCW output. The delayed sinusoidal component RCW samples (1F(k−1), 1F(k−2), 2F(k−1), and 2F(k−2)) are called "internal oscillator states." The sinusoidal component RCWs represent the output of the summing nodes and oscillate sinusoidally at their respective frequencies as determined by the $d_1$ and $d_2$ values.

The servo compensation system 202 may be implemented as an algorithm run on a digital processor or digital signal processor. The servo compensation system 202 is typically used in a disk drive system where each track on a disk includes a specified number (e.g., 90) of servo fields 240, which are evenly spaced around the track. Position data within each servo field is converted by the Position Measurement System 201 into an instantaneous sample of the head 220 position relative to the track. Thus, the servo fields 240 provide sampled position information. As such, servo fields 240 are also commonly referred to as "servo samples."

Each track contains an identical number of servo samples 240, which are aligned circumferentially with servo samples of other tracks. Those skilled in the art will appreciate that the alignment may change slightly between successive tracks in disk drives with rotary actuators so that the timing, when reading the servo data, does not change during seek operations.

The servo sample rate thus remains constant in a seek or follow mode. In addition, the servo samples 240 are typically numbered for identification purposes. The present invention uses the servo samples as a reference for defining phase and amplitude and for adjusting phase and amplitude. The phase of sinusoidal component RCW is described as the first servo sample number including and after sample number 0, where the sinusoidal component RCW transitions from a negative to a positive (or 0) value.

As described above, the oscillators 302 and 304 each include a pair of internal oscillator states 306 and 308, and 310 and 312, respectively. Each of these state pairs represents an RCW delayed by one and two sample times. The particular values of the states at a particular servo sample number determines the peak amplitude and phase of an RCW. The oscillators 302 and 304 achieve and maintain oscillation by executing "difference equations," which are defined as 1F(k)=d1*1F(k−1)−1F(k−2) and 2F(k)=d2*2F(k−1)−2F(k−2), respectively, with inputs turned off. The difference equation may be implemented as an algorithm run on any suitable hardware such as processor, a digital signal processor, a state machine, etc. The difference equation is computed once at each servo sample time, as is typical for a digital filer, compensator, or oscillator. Each time the difference equation is calculated, the resulting sinusoidal component RCW output advances to the next value corresponding to the sinusoidal RCW output.

Figure 4A:
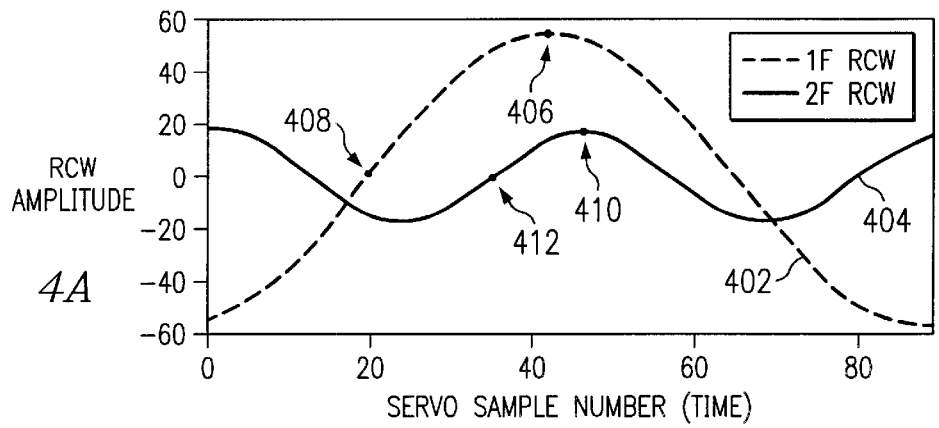
FIG. 4A shows a graph of exemplary 1F RCW and 2F RCW with reference to servo samples in an exemplary track.

FIG. 4A shows a graph of exemplary 1F RCW 402 and 2F RCW 404 with reference to servo samples in an exemplary track. The track has 90 servo samples. The 1F RCW 402 and 2F RCW 404 are first and second sinusoidal harmonics, respectively. The 1F RCW 402 is described by a peak amplitude 406 of value 55 and a phase 408 of 20, which is the first servo sample number at which the 1F RCW 402 transitions from negative to positive amplitude. Similarly, the 2F RCW 404 is described by a peak amplitude 410 of value 55 and a phase 412 of 35, which is the first servo sample number at which the 2F RCW 404 transitions from negative to positive amplitude. Thus, the disk drive system 200 may measure the amplitude and phase of sinusoidal component RCWs by using the servo samples in the disk as references.

Figure 4B:
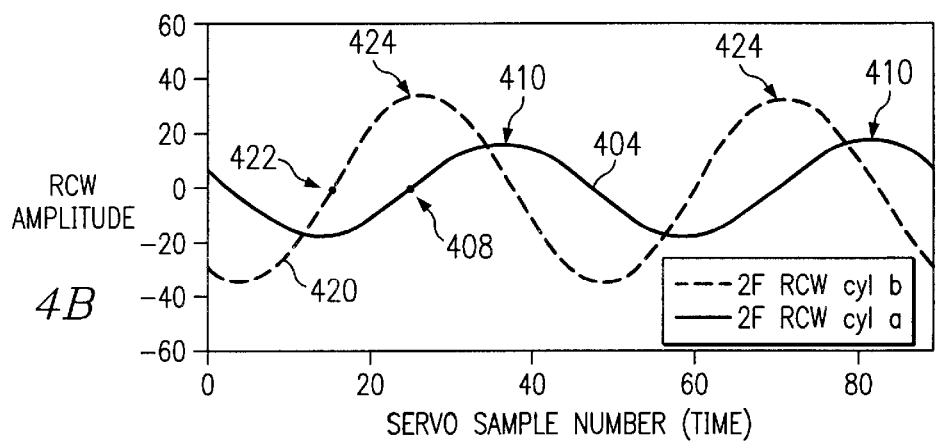
FIG. 4B illustrates a graph of exemplary 2F RCWs measured at two different tracks A and B, respectively.

FIG. 4B illustrates a graph of exemplary 2F RCWs 404 and 420 measured at two different tracks A and B, respectively. The 2F RCW 404 is characterized by an amplitude 410 of value 17 and a phase 408 of 25. On the other hand, the 2F RCW 420 is characterized by an amplitude 424 of 34 and a phase 422 of 15. The amplitude and phase of the 2F RCWs 404 and 420 are tabulated in the following Table 1.

TABLE 1

|  | 2F RCW at track A | 2F RCW at track B |
| --- | --- | --- |
| Amplitude | 17 | 34 |
| Phase | 25 | 15 |

The present invention minimizes the transient conditions in the servo control system 200 after a seek is completed by adjusting the sinusoidal component RCWs and corresponding internal filter states to match pre-determined sinusoidal component RCW amplitude and phase requirements of the destination track. Hence, the sinusoidal component RCWs are not subject to significant transient conditions after the seek. This adjustment may be accomplished at the beginning, during, or at the end of a seek operation and preferably during an oscillation mode of the compensation system 202. Since the RCW transients are minimized, transients in the PES will also be significantly reduced, thereby allowing read and write operations to occur more rapidly with proper alignment after a seek is completed. Thus, the present invention enhances disk drive performance and data reliability.

FIG. 5 illustrates a flow chart of a method for correcting run-out errors in a disk drive system in accordance with one embodiment of the present invention. The method starts in operation 502 and proceeds to operation 504, where the disk drive system determines sinusoidal component run-out correction waveforms for a set of sample tracks in a disk by measuring an amplitude and a phase of each of the sinusoidal component run-out correction waveforms for each of the sample tracks. These calibration measurements may be made using any suitable methods for measuring run-out correction waveforms. For example, a head may be allowed to follow the sample track until the head becomes substantially centered over the track. At such time, the amplitude and phase of each of the sinusoidal component run-out correction waveforms are measured. For example, an amplitude and a phase are measured for each of the oscillators 302 and 304.

During the calibration measurement, the RCW amplitude and phase values are not adjusted during seeks and the above mentioned transients are allowed to occur. The calibration measurements are preferably made after the transients die out. The amplitude is measured as a peak value of the sinusoidal component RCW while the phase is measured as a sample delay from some fixed servo sample on a disk, where the sinusoidal component RCW undergoes a positive zero crossing.

These amplitude and phase values are stored in a random access memory (RAM) or any other suitable memory as a calibration table for subsequently determining an RCW amplitude and phase of a track in the disk. The calibration process may be performed at any time before seeking to a destination track. Preferably, the calibration is carried out when the disk drive system is powered up.

After calibration, the oscillators 302 and 304 are operated in run-out correction mode for a start track in operation 506, where the sinusoidal component RCWs' phase and amplitude are adapted to minimize run-out error in the PES. The start track is a current track over which a head is positioned and from which a seek operation to a destination track will be performed. In practice, the amplitude and phase of the sinusoidal component RCWs will be substantially correct for the start track before the seek operation. This is because the disk drive will have completed a read or write operation, which requires the run-out error condition for the start track to be corrected beforehand. Hence, the amplitude and phase of sinusoidal component RCWs (e.g., 1F RCW, 2F RCW) are optimal, i.e., correct, for the start track before seeking to the destination track.

Then in operation 508, the disk drive system performs a seek to the destination track by moving the head from the start track to the destination track. During the seek operation, the disk drive system also oscillates internal oscillators (e.g., 1F, 2F, NF) within the servo compensation system 202. During the seek, the phase and amplitude of each oscillator and corresponding sinusoidal component RCW output will continue to match the phase and amplitude of the start track. This is because the input paths to the oscillators are disconnected at the beginning of the seek operation. The matching condition will continue until either the input paths are reconnected at the end of the seek mode or the oscillators are adjusted by means to be described below.

Concurrent with the seek operation, the difference in amplitude and phase for each sinusoidal component RCW between the start track and the destination track is determined in operation 510 based on a selected set of measured amplitudes and phases from the calibration table. Then in operation 510, the phase and amplitude differences are used, concurrent with the seek operation 506, to adjust each sinusoidal component RCW phase and amplitude so that each sinusoidal component RCW is optimal for the destination track. As described in various embodiments herein, the adjustment of sinusoidal component RCW phase and amplitude is preferably performed by adjusting the phase and amplitude of each of the associated oscillators.

In a preferred embodiment, an interpolation is used to determine the RCW amplitude and phase on tracks not measured during the calibration. Those skilled in the art will appreciate that any interpolation method and number of measurement samples may be employed to suit various mechanical characteristics of disk drives. In most cases, the amplitude and phase may be assumed to vary linearly as a function of track number such that calibration measurements are needed for at least two cylinders (e.g., innermost and outermost tracks). The sinusoidal component RCW amplitude and phase may then be determined by a linear interpolation using a pair of data points. Alternatively, if the amplitude and phase do not vary linearly as a function of track number over the entire disk, then the tracks may be partitioned into a set of tracks, each of which possesses linear characteristics.

By way of example, the amplitude and phase of a destination track number 500 can be interpolated from a set of measured amplitudes and phases of track numbers 0 and 1,000. Preferably, the amplitude and phase are interpolated in a linear fashion based on the position of the destination track with respect to the measured tracks.

Then in operation 514, the disk drive servo control system operates in follow mode at the destination track. By virtue of the adjustments made in operation 512, the run-out correction signal will be substantially correct for the destination track such that the disk drive system substantially corrects the run-out error in the destination track. The method then terminates in operation 516.

At the start of a seek operation, a difference in amplitude and phase of each sinusoidal component RCW between the start and destination tracks is computed using the interpolated data. During the seek, the run-out correction oscillators (C.g., 1F, 2F) are adjusted based on these differences such that the outputs of these oscillators match the proper sinusoidal component RCWs needed at the destination cylinder for optimal run-out correction.

A phase adjustment value (P) and an amplitude multiplier (M) are determined from the calibration table data based on the start and destination track locations. The phase adjustment value P and amplitude adjustment value M (e.g., amplitude multiplier) are determined separately for each of the oscillators 302 and 304. Preferably, this operation is performed during the seek operation. During the seek operation or when the seek operation ends, the phase adjustment values P and amplitude adjustment values M are used to adjust each of the oscillators 302 and 304 in operation 512. The phase adjustment value P represents a phase difference between the sinusoidal component RCW phases of the start and destination tracks. The amplitude multiplier, when multiplied with the amplitude of the sinusoidal component RCW of the start track, produces the amplitude of the sinusoidal component RCW of the destination track.

FIG. 6 illustrates a more detailed flow chart of the operation 510 of computing the difference in phase and amplitude for each sinusoidal component RCW between the start and destination tracks in accordance with one embodiment of the present invention. The operation 510 starts in operation 602 and proceeds to operation 604, where a phase adjustment value (P) for each of the sinusoidal component RCWs is determined by computing a difference between the phases of the start and destination tracks using interpolated data from the calibration table. With reference to FIG. 4B, for example, the phase difference in seeking from track A with phase of 25 to track B having phase of 15 is −10. In operation 606, an amplitude adjustment value (M) is computed by dividing the amplitude of the destination track by the amplitude of the start track using the interpolated data from the calibration table. The amplitude adjustment value M is essentially an amplitude multiplier. For instance, an amplitude multiplier in seeking from track A with an amplitude of 17 to track B having an amplitude of 34 of FIG. 4B is 2. The operation 510 then terminates in operation 608.

After determining the phase adjustment value P and amplitude multiplier M for each of the sinusoidal component RCWs, the phase and amplitude of each sinusoidal component RCW is adjusted to match the amplitude and phase of the destination track. At this time, the oscillators associated with each sinusoidal component RCW are typically operating at the start track phase and amplitude. FIG. 7 illustrates a more detailed flow chart of the operation 512 of adjusting the phase and gain of each of the sinusoidal component RCW for the destination track in accordance with one embodiment of the present invention. The operation 512 begins in operation 702 and proceeds to operation 704, where the phase of each of the sinusoidal component RCWs is adjusted using the associated phase adjustment value P. In operation 706, the amplitude of each sinusoidal component RCW is adjusted by using the amplitude adjustment value M. The disk drive system operates in a follow mode at the destination track, at which time the oscillators have already been adjusted to produce sinusoidal RCWs that are substantially correct for the destination track. The operation 512 then terminates in operation 708.

FIG. 8 shows a more detailed flow chart of the operation 704 of adjusting the phase of a sinusoidal component RCW for the start track to generate a sinusoidal component RCW with phase adjusted for the destination track. The phase adjustment operation begins in operation 802 and proceeds to operation 804, where it is determined whether the phase needs to be advanced or retarded. In a preferred embodiment, the phase of an oscillator is adjusted by advancing or retarding the phase of the start track to match the RCW phase of the destination track.

If the phase adjustment value P is positive, the phase of the RCW of an associated oscillator is advanced, in operation 806, by executing the difference equation associated with the oscillator P number of times. The execution of the difference equation may be done at each servo sample time or, more preferably, between servo sample times. When the difference equation is executed P number of times between servo sample times, the phase advancement occurs substantially instantaneously with respect to operation of the oscillators.

On the other hand, if the phase adjustment value is negative, the phase is retarded to match the phase of the destination track. In operation 808, the internal oscillation state values for an oscillator are interchanged. For example, the internal states of delay elements 306 and 308 of 1F oscillator 302 are interchanged, for example, by using a RAM. Then in operation 810, the difference equation associated with the oscillator is executed |P| number of times. As with the phase advancing operation 806, the execution of the difference equation may be done at each servo sample time or, more preferably, between servo sample times. When the difference equation is executed |P| number of times between servo sample times, the phase advancement occurs substantially instantaneously with respect to operation of the oscillators.

In operation 812, the internal states of the delay elements are interchanged again. The operations 808, 810, and 812 essentially runs a digital oscillator backwards to achieve a desired phase retardation. In the alternative, the phase may be retarded by advancing the phase of the oscillator by N+P executions of the difference equations, where N is the number of servo samples in one revolution of the disk. The operation 704 then terminates in operation 814.

The RCW amplitude of an oscillator may be changed simply by applying a scaling factor, i.e., amplitude multiplier M, to both of the internal oscillator states simultaneously. FIG. 9 illustrates a more detailed flow chart of the operation 706 of adjusting the amplitude of each sinusoidal component RCW for the start track to generate an amplitude for each of the sinusoidal component RCWs for the destination track. The amplitude adjustment operation 606 begins in operation 902 during a seek operation and proceeds to operation 904, where internal states of an oscillator are accessed. For example, the internal states of delay elements 306 and 308 of 1F oscillator 302 may be read into a RAM.

Then in operation 906, each of the accessed internal states is multiplied by the amplitude multiplier M to generate a product. This operation, in essence, scales the internal state values. By way of example, when adjusting amplitude from track A with a 2F RCW amplitude of 17 to track B with a 2F RCW amplitude of 34 as illustrated in Table 1, the values of each internal oscillator states are doubled simultaneously. In one embodiment, the internal oscillator states are adjusted between two adjacent servo sample times during a seek operation so that the amplitude and phase adjustments occur substantially instantaneously with respect to the operation of the oscillators.

In operation 908, the resulting products are force fed into the oscillator as new internal states so that the internal states are changed instantaneously. For instance, the resulting products may be force fed into respective delay elements 306 and 308 of the 1F oscillator 302. The operation 706 then terminates in operation 910.

The present invention provides a simple solution for generating a run-out correction waveform for a destination track by adjusting the phase and amplitude. Specifically, the phase and amplitude adjustment involves modification of internal states of an oscillator by using phase adjustment value and amplitude multiplier. The phase adjustment may be further simplified by providing retarding of the phase as well as advancing the phase by switching the internal states of the oscillator.

The present invention thus provides methods and a system for efficiently correcting run-out errors in disk drive systems without a substantial response time to adjust to the physical conditions of the destination track. For example, the present invention reduces position error signal transients after seeks by forcing the compensation system to generate a proper run-out correction waveform immediately after a seek operation. Hence, run-out errors are corrected substantially instantaneously at the beginning of a follow mode without a substantial response time.

While this invention has been described in terms of several preferred embodiments, there are alterations, permutations, and equivalents which fall within the scope of this invention. It should also be noted that there are alternative ways of implementing both the method and apparatus of the present invention. It is therefore intended that the following appended claims be interpreted as including all such alterations, permutations, and equivalents as fall within the true spirit and scope of the present invention.

What is claimed is:

1. A method for correcting run-out errors in a disk drive system, the disk drive system including a servo compensation system coupled to a read/write head, the servo compensation system being adapted to generate a run-out correction waveform for a track in a disk, the run-out correction waveform including one or more sinusoidal component waveforms, each sinusoidal component waveform being defined by a phase and an amplitude, the method comprising:

measuring an amplitude and a phase of one or more sinusoidal component waveforms for a set of specified tracks in a disk;

determining a phase and an amplitude of one or more sinusoidal component waveforms for a destination track based on a measured amplitude and a measure phase of the one or more measured sinusoidal component waveforms, the sinusoidal component waveforms for the destination track being adapted to substantially correct a run-out error in the destination track; and generating a run-out correction waveform for the destination track, using a plurality of oscillators, each oscillator adapted to generate a sinusoidal component waveform of a specified harmonic, such that the disk drive system substantially corrects the run-out error in the destination track.

2. The method as recited in claim 1, further comprising:

obtaining an amplitude and a phase of one or more sinusoidal component waveforms at a start track.

3. The method as recited in claim 2, wherein the operation of generating the one or more sinusoidal component waveforms for the destination track further comprises:

determining a phase adjustment value and an amplitude adjustment value for the destination track;

adjusting the phase of the one or more sinusoidal component waveforms of the start track to generate the phase of the one or more of the sinusoidal component waveforms for the destination track in response to the phase adjustment value; and adjusting the amplitude of the one or more sinusoidal component waveforms of the start track to generate the amplitude of the one or more of the sinusoidal component waveforms for the destination track in response to the amplitude adjustment value.

4. The method as recited in claim 3, wherein the phase adjustment value is a difference between a phase of the sinusoidal component waveform of the start track and a phase of the sinusoidal component waveform of the destination track.

5. The method as recited in claim 3, wherein the amplitude adjustment value is determined by dividing an amplitude of the sinusoidal component waveform of the destination track by an amplitude of the sinusoidal component waveform of the start track.

6. The method as recited in claim 3, wherein the compensation system includes a plurality of oscillators, each oscillator having a pair of internal states and being associated with one sinusoidal component waveform, each of the oscillators being capable of advancing upon execution of a difference equation, wherein each of the oscillators adjusts the phase of associated sinusoidal component waveform by executing the difference equation |P| number of times, where P is the phase adjustment value.

7. The method as recited in claim 6, wherein the phase is adjusted by advancing the phase.

8. The method as recited in claim 6, wherein the phase is adjusted by retarding the phase, the phase retarding comprising:

interchanging the states of the oscillator;

executing the difference equation of the oscillator |P| times such that the internal states of the oscillator has new internal states; and interchanging the new internal states of the oscillator.

9. The method as recited in claim 6, wherein the phase is advanced when a phase of the sinusoidal component waveform for the start track is less than the phase of the sinusoidal component waveform for the destination track.

10. The method as recited in claim 3, wherein the compensation system includes a plurality of oscillators, each oscillator having a pair of internal states, each oscillator being associated with one of the sinusoidal component waveforms, wherein the amplitude for the associated sinusoidal component waveform is adjusted by multiplying each of the internal states with the associated amplitude adjustment value.

11. The method as recited in claim 10, wherein the sinusoidal component waveforms for the destination track is interpolated based on the measured set of specified tracks.

12. The method as recited in claim 11, wherein the interpolation is a linear interpolation.

13. The method as recited in claim 12, wherein the set of specified tracks include an innermost track and an outermost track in the disk.

14. The method as recited in claim 3, wherein the compensation system includes a plurality of oscillators, each oscillator having a pair of internal states and being associated with one sinusoidal component waveform, wherein the amplitude adjusting comprises:

accessing the internal states of the oscillators;

scaling the internal states of the oscillators by multiplying each of the internal states by the associated amplitude adjustment value; and force feeding the scaled internal states as new internal states of the associated oscillators.

15. The method as recited in claim 3, wherein the operation of adjusting the phase and the amplitude occurs during a seek mode and wherein the sinusoidal component waveforms are generated in a follow mode immediately following the seek mode.

16. The method as recited in claim 3, wherein the servo compensation system includes a first oscillator adapted to output the run-out correction waveform for the destination track, the first oscillator being configured to oscillate at the amplitude and frequency of the start track during a seek operation.

17. The method as recited in claim 1, wherein the sinusoidal component waveform is a sine wave.

18. A servo compensation system for correcting run-out errors in a disk drive system, the disk drive system including the servo compensation system coupled to a read/write head, the compensation system being adapted to generate a run-out correction waveform for a track in a disk, each run-out correction waveform including one or more sinusoidal component waveforms, each sinusoidal component waveform being defined by a phase and an amplitude, the system comprising:

means for measuring an amplitude and a phase of one or more sinusoidal component waveforms for a set of specified tracks in a disk;

means for determining a phase and an amplitude of one or more sinusoidal component waveforms for a destination track based on a measured amplitude and a measured phase, the one or more sinusoidal component waveforms for the destination track being adapted to substantially correct a run-out error in the destination track; and means for generating the one or more sinusoidal component waveforms for the destination track such that the disk drive system substantially corrects the run-out error in the destination track, said means comprising a plurality of oscillators, each oscillator adapted to generate a sinusoidal component waveform of a specified harmonic.

19. The system as recited in claim 18, further comprising:
means for obtaining an amplitude and a phase of a run-out correction waveform at a start track.

20. The system as recited in claim 19, wherein the means for generating the sinusoidal component waveforms for the destination track further comprises:

means for determining a phase adjustment value and an amplitude multiplier for the destination track;

means for adjusting the phase from a sinusoidal component waveform for the start track in response to the phase adjustment value; and means for adjusting the amplitude from the start track in response to the amplitude adjustment value.

21. The system as recited in claim 20, wherein the phase adjustment value is a difference between a phase of a sinusoidal component waveform of the start track and a phase of the sinusoidal component waveform of the destination track.

22. The system as recited in claim 20, wherein the amplitude multiplier is determined by dividing the amplitude of the sinusoidal component waveform of the destination track by an amplitude of the sinusoidal component waveform of the start track.

23. The system as recited in claim 20, wherein the compensation system further includes an oscillator having a pair of internal states, the oscillator being capable of advancing upon execution of a difference equation, wherein the phase is adjusted by executing the difference equation $|P|$ number of times, where P is the phase adjustment value.

24. The system as recited in claim 23, wherein the phase is adjusted by advancing the phase.

25. The system as recited in claim 23, wherein the phase is adjusted by retarding the phase, the phase retarding comprising:

interchanging the states of the oscillator;

executing the difference equation of the oscillator P times such that the internal states of the oscillator has new internal states; and interchanging the new internal states of the oscillator.

26. The system as recited in claim 23, wherein the phase is advanced when the phase of the sinusoidal component waveform for the start track is less than the phase of the sinusoidal component waveform for the destination track.

27. The system as recited in claim 20, wherein the compensation system includes an oscillator that has a pair of internal states, wherein the amplitude is adjusted by multiplying each of the internal states with the amplitude multiplier.

28. The system as recited in claim 20, wherein the compensation system includes an oscillator that has a pair of internal states, wherein the amplitude adjusting means comprises:

means for accessing the internal states of the oscillator;

means for scaling the internal states by multiplying each of the internal states by the amplitude multiplier; and means for force feeding the scaled internal states as new internal states of the oscillator.

29. By The system as recited in claim 18, wherein the sinusoidal component waveform for the destination track is interpolated based on the measured set of specified tracks.

30. The system as recited in claim 18, wherein the set of specified tracks include an innermost track and an outermost track in the disk.

31. A method for adjusting run-out correction waveforms in a disk drive system, the disk drive system including a servo compensation system coupled to a read/write head, the servo compensation system being adapted to generate sinusoidal component run-out correction waveforms, each of the sinusoidal component run-out correction waveforms being defined by a phase and an amplitude, the disk drive system operation in a seek mode from a start track to a destination track, the start track and the destination track each having sinusoidal component run-out correction waveforms that are each defined by a phase and an amplitude, the method comprising:

adjusting, for each sinusoidal component run-out correction waveforms, the phase from a sinusoidal component run-out correction waveform for the start track in response to the phase adjustment value, said adjusting step using a plurality of oscillators, each oscillator being associated with one sinusoidal run-out correction waveform;

adjusting, for each sinusoidal component run-out correction waveforms, the amplitude from the start track in response to the amplitude adjustment value; and generating the sinusoidal component run-out correction waveforms for the destination track such that the disk drive system substantially corrects the run-out error in the destination track.

32. The method as recited in claim 31, wherein the phase and amplitude are adjusted during a seek mode.

33. The method as recited in claim 31, wherein the sinusoidal component run-out correction waveforms for the destination track are generated in a follow mode after the seek mode.

34. The method as recited in claim 31, wherein the phase adjustment value is a difference between a phase of a sinusoidal component run-out correction waveform of the start track and a phase of the sinusoidal component run-out correction waveform of the destination track.

35. The method as recited in claim 31, wherein the amplitude multiplier is determined by dividing the amplitude of a sinusoidal component run-out correction waveform of the destination track by an amplitude of a sinusoidal component run-out correction waveform of the start track.

36. The method as recited in claim 31, wherein the compensation system includes an oscillator having a pair of internal states, the oscillator capable of advancing upon execution of a difference equation, wherein the phase is adjusted by executing the difference equation P number of times, where P is the phase adjustment value.

37. The method as recited in claim 36, wherein the phase is adjusted by retarding the phase, the phase retarding comprising:

interchanging the states of the oscillator;

executing the difference equation of the oscillator |P| times such that the internal states of the oscillator has new internal states; and interchanging the new internal states of the oscillator.

38. The method as recited in claim 36, wherein the phase is advanced when a phase of a sinusoidal component run-out collection waveform for the start track is less than a phase of a sinusoidal component run-out correction waveform for the destination track.

39. The method as recited in claim 31, wherein the compensation system includes an oscillator that has a pair of internal states, wherein the amplitude is adjusted by multiplying each of the internal states with the amplitude multiplier.

40. The method as recited in claim 31, wherein the compensation system includes an oscillator that has a pair of internal states, wherein the amplitude adjusting comprises:

accessing the internal states of the oscillator;

scaling the internal states by multiplying each of the internal states by the amplitude multiplier; and force feeding the scaled internal states as new internal states of the oscillator.

41. A method for correcting run-out errors in a disk drive system, the disk drive system including a servo compensation system coupled to a read/write head, the servo compensation system includes a plurality of oscillators, each oscillator having a pair of internal states and being associated with one sinusoidal component waveform, the servo compensation system being adapted to generate a run-out correction waveform for a track in a disk, the run-out correction waveform including one or more sinusoidal component waveforms, each sinusoidal component waveform being defined by a phase and an amplitude, each of the oscillators being adapted to generate a sinusoidal component waveform, the method comprising:

measuring an amplitude and a phase of one or more sinusoidal component waveforms for a set of specified tracks in a disk;

obtaining an amplitude and a phase of one or more sinusoidal component waveforms at a start track;

seek to a destination track by operating the oscillators in an oscillation mode;

during the seek operation, computing a difference in phase and amplitude for each sinusoidal component waveform between the start track and the destination track; and adjusting the phase and amplitude of an oscillator associated with each sinusoidal component waveform.

42. The method as recited in claim 41, further comprising:

operating the oscillators in a follow mode at the destination track such that the run-out error is substantially corrected.

43. The method as recited in claim 41, wherein the operation of computing the difference in phase and amplitude comprises determining a phase adjustment value and an amplitude adjustment value.

44. The method as recited in claim 43, wherein the phase and amplitude adjusting further comprises:

adjusting the phase using the phase adjustment value; and adjusting the amplitude using the amplitude adjustment value.

* * * * *